P. HINKLEY.
MOTOR CAR LOCK.
APPLICATION FILED MAY 3, 1915.
1,192,309.
Patented July 25, 1916.
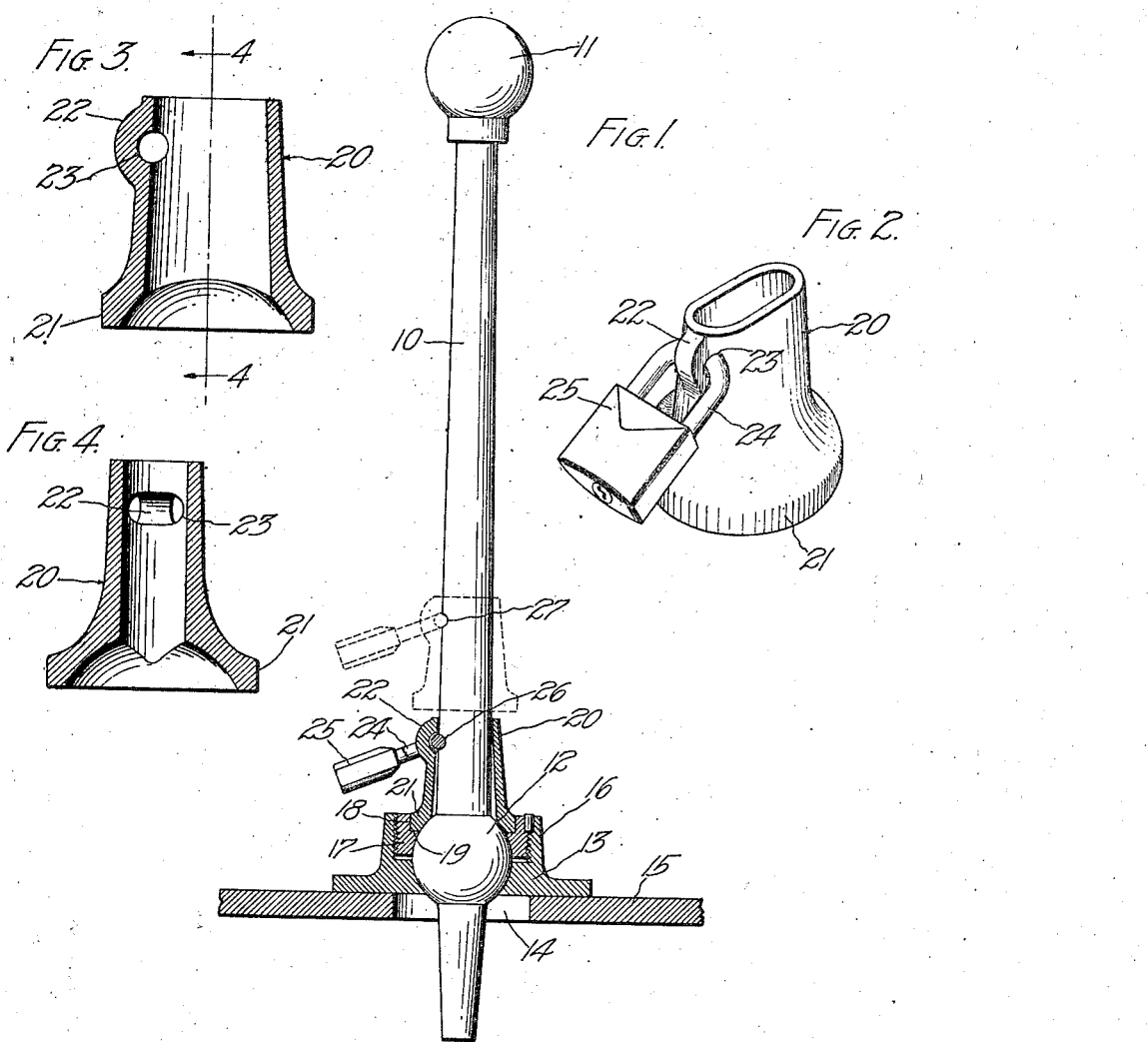
INVENTOR
Paul Hinkley.
by Hazard Berry & Miller
HIS ATTORNEYS

UNITED STATES PATENT OFFICE.

PAUL HINKLEY, OF LOS ANGELES, CALIFORNIA.

MOTOR-CAR LOCK.

1,192,309.

Specification of Letters Patent.

Patented July 25, 1916.

Application filed May 3, 1915. Serial No. 25,387.

*To all whom it may concern:*

Be it known that I, PAUL HINKLEY, a citizen of the United States, residing at Los Angeles, in the county of Los Angeles and State of California, have invented new and useful Improvements in Motor-Car Locks, of which the following is a specification.

This invention relates to a motor car lock.

It is the object of this invention to provide a device for locking motor cars against unprivileged use, which is so constructed that it may be readily applied to the clutch or transmission controlling lever of the motor car so as to lock the lever against movement in its neutral position, that is with the clutch in its inoperative position or the transmission gears in their intermediate inoperative position.

A further object is to provide a device of the above character which is especially adapted for use on the controlling lever of motor cars of the Dodge type by which the lever may be securely locked in its intermediate position to prevent the motor from being connected to the driving gear of the vehicle thus locking the latter against being driven under its motive power but permitting operation of the motor or moving of the vehicle on its running gear.

A further object is to provide a locking device which is simple in construction, economical in manufacture and which can be readily applied and removed.

The invention resides in a sleeve member adapted to be slidably mounted on the controlling lever and arranged to seat on the lever bearing with means for locking the sleeve in its seated position to rigidly hold the lever in its neutral position.

The invention is illustrated in the accompanying drawings in which:

Figure 1 is a side view in vertical section and elevation of a controlling lever such as is employed on a Dodge motor car, illustrating the invention as applied. Fig. 2 is a perspective view of the invention. Fig. 3 is a view in vertical section of the slidable sleeve. Fig. 4 is a view in transverse section of same as seen on the line 4—4 of Fig. 3 in the direction indicated by the arrows.

More specifically, 10 indicates a controlling lever which is fitted with a hand hold 11 at its upper end and is connected to any suitable driving mechanism (not shown) at its lower end; the driving mechanism being of such character as to be disposed in a neutral or inoperative position when the lever 10 is in its vertical or neutral position as shown in Fig. 1. The lever 10 is formed with a ball portion 12 intermediate its ends which seats on a socket bearing plate 13 arranged over a slot 14 in the floor 15 of the vehicle. The bearing plate is formed with an upwardly extending internally threaded flange 16 to receive an externally threaded ring 17 adapted to slidably engage the ball 12 above its horizontal center to complete the socket bearing of the ball 12 which forms a universal mounting for the lever 10 on which the latter may be rocked in any direction.

In carrying out the present invention the ring 17 is preferably formed with a depression on its upper face having an annular vertical wall 18 and an inwardly extending horizontal wall 19. This depression forms a seat for the locking member constituting the invention, which locking member comprises a sleeve 20 which encircles the lever 10 and is slidable vertically thereon with means for locking the sleeve on the lever 10 with its lower end seated in the depression in the ring 17. The lower end of the sleeve 20 is formed with an outwardly extending flange 21 the outer wall of which is adapted to snugly fit the vertical wall 18; the lower inner marginal edge of the sleeve being curved inwardly on an arc so as to conform to the upper portion of the ball 12.

Formed on one side of the sleeve 20 is a boss 22 having a transverse opening 23 therethrough adapted to receive the hasp 24 of a padlock 25. The opening 23 extends transversely through the sleeve 20 so as to open to the interior of the sleeve 20 at a point contiguous to the edge of the lever 10; the edge of the lever 10 extending substantially in alinement with the vertical center of the opening 23.

Formed on the edge of the lever 10 is a pair of spaced notches 26 and 27 which are preferably semi-circular and arranged to be disposed opposite the opening 23 and adapted to engage the hasp 24. The notch 26 is formed at such point on the lever 10 as to extend in alinement with the opening 23 when the sleeve 20 is disposed in its lowermost position and seated on the ring 17. The notch 27 may be disposed at any suitable point above the notch 26 so that when the sleeve 20 is arranged with the opening 23 opposite thereto and the hasp 24 engaged with the opening 23 and notch 27 the sleeve 20 will be positioned a sufficient distance above the ring 17 as to permit movement of the lever 10.

In order to mount the sleeve 20 on the lever 10 the hand hold 11 is demountably attached to the hand lever 10 being secured to the latter after the sleeve 20 has been put in place.

In the operation of the invention, when it is desired to operate the lever 10 the sleeve 20 is positioned thereon with the opening 23 opposite the notch 27 and secured against displacement by introducing the hasp 24 on the padlock 25 through the opening 23 and notch 27 as indicated in dotted lines in Fig. 1. By locking the hasp 24 the sleeve 20 will be held against movement in relation to the lever 10 and will be disposed clear of the ring 17.

When it is desired to lock the lever 10 against unauthorized operation the hasp 24 is withdrawn out of engagement with the opening 23 and notch 27 and the sleeve 20 is moved downwardly into its seated position on the ring 17; the lever 10 being previously disposed in a vertical and neutral position as shown in Fig. 1. The hasp 24 is then engaged with the opening 23 and notch 26 and locked by the padlock 25 thus locking the sleeve 20 against displacement and holding it against the ring 17 and ball 12. The lower edge of the sleeve 20 engaging the ring 17 and extending outwardly around the ball 12 forms an annular shoulder which in seating on the face 19 effectively holds the lever 10 against movement when the sleeve is locked against displacement by the hasp 24 engaging the notch 26.

While I have shown the invention as applied to a lever mounted for universal rocking movement, it is manifest that it may be attached to a lever mounted to have rocking movement on a single plane; the sleeve 20 being adapted to bear against and seat upon a surface extending at right angles to the lever 10 to effect its locking function.

What I claim is:

1. In a locking device for levers the combination with a lever having a notch on its edge, of a ring encircling the lever, a slidable sleeve on the lever having a transverse opening therethrough overlapping the edge of the lever adapted to register with the notch when the sleeve is within the ring, and means insertible through the opening engageable with the notch for locking the sleeve against movement in relation to the lever and ring.

2. In a locking device for levers, the combination with a lever having a transverse notch on one edge thereof, of a ring encircling the lever adjacent its fulcrum, having an inwardly extending wall, a sleeve slidably mounted on said lever adapted to seat on the wall having a transverse opening therethrough communicating with the interior of the sleeve and overlapping the edge of the lever so as to register with the notch in the latter when the sleeve is in its seated position, and means insertible through the opening engaging the notch for locking the sleeve against movement in relation to the lever and seat.

In witness that I claim the foregoing I have hereunto subscribed my name this 16th day of April, 1915.

PAUL HINKLEY.